United States Patent [19]
Ray et al.

[11] 3,872,457
[45] Mar. 18, 1975

[54] BATTERY MONITOR

[75] Inventors: John S. Ray, 138 Belfast Dr., San Antonio, Tex. 48209; James D. King, San Antonio, Tex.

[73] Assignee: said Ray, by said King

[22] Filed: July 31, 1972

[21] Appl. No.: 276,389

[52] U.S. Cl. ................................. 340/249, 320/48
[51] Int. Cl. ............................................ G08b 21/00
[58] Field of Search ................ 340/249; 320/48, 19

[56] References Cited
UNITED STATES PATENTS
3,293,529   12/1966   Fontaine .......................... 320/48 X
3,305,754   2/1967    Oaks et al. ........................ 320/48 X
3,413,536   11/1968   Webb ............................... 320/48 X Primary Examiner—John W. Caldwell
Assistant Examiner—Daniel Myer
Attorney, Agent, or Firm—Donald R. Comuzzi; Ted D. Lee

[57] ABSTRACT

A self-monitoring system for batteries which continuously scans individual cells in succession and signals faulty cells at intervals determined by the sequencing rate and the number of cells being monitored.

3 Claims, 5 Drawing Figures

BATTERY MONITOR

BACKGROUND OF THE INVENTION

The present invention relates to battery testers and is concerned more particularly with a continuous monitor for individually and sequentially testing the cells of batteries and providing an alarm signal whenever a cell varies from a preselected voltage range and recurrently each time that cell is tested at its sequence interval.

BRIEF DESCRIPTION OF THE PRIOR ART

A variety of battery testers have been tried, including separate-cell sensors, manual sequencing switches, panel alarms, low-cell isolators and drains for recharge, lamp-pulsers to indicate charge level, and other arrangements of varying degrees of sophistication.

Many require conscious tuning or interrogation by the operator, which adds to the burden of a pilot or flight officer, and invites disregard in annoyance.

Others provide just another flashing light on the panel which must be evaluated according to their rate of flashing.

Certain prior units lock onto a fault alarm, so that a momentary error in the system becomes a permanent fault signal which can provoke or, depending on the regulations involved, mandate emergency termination of a flight for an error signal or a weak cell which is essentially safe but marginal with respect to selected norms.

None of the prior testers have been found to be entirely satisfactory. There remains a need for a self-monitoring system which signals only true faults to the operator or pilot without his constant or repeated attention to the system.

SUMMARY OF THE INVENTION

In general, the preferred form of the present invention comprises a self-monitoring battery system including a battery having a plurality of cells, a sensing scanner engaging the cells individually and in continuously repeated sequence. The scanner thus places the cells in circuit with a detector which evaluates the cell with regard to a predetermined range of a valve, such as polarity or voltage. The detector includes a means for emitting a signal to an alarm circuit in response to a departure of the valve from the predetermined range.

BRIEF DESCRIPTION OF THE DRAWINGS

A better understanding of the invention may be derived from the following description and accompanying drawings, in which.

DESCRIPTION OF THE PREFERRED EMBODIMENT BROADLY

Figure 1:
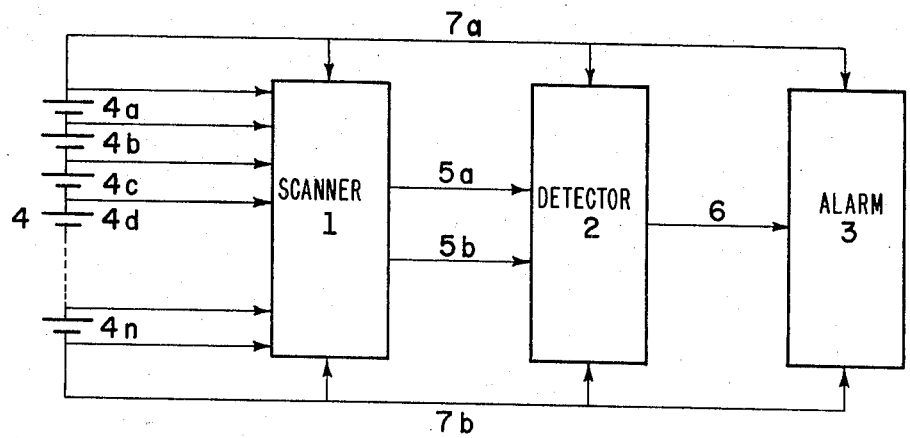
FIG. 1 is a schematic block diagram of the preferred form of the invention.

As shown in FIG. 1, the preferred form of the invention includes a scanner 1, a detector 2, an alarm 3, and a battery 4 including a plurality of cells C indicated with letter subscripts such as cell 4a, 4b, etc.

The scanner 1 is effective for each individual cell of the battery to be connected individually and for a short period of time to the input terminals 5a and 5b, of the detector 2 and operates in such a manner that over a sufficient time interval each of the cells is connected in turn to the input of the detector. Once each of the cells C of the battery 4 have, by action of the scanner 1 been connected to the detector 2, the scan cycle is repeated and the scan cycle continues to be automatically repeated as long as the scanner is energized.

The detector 2 senses the signal voltage across the input terminals 5a and 5b. If the input signal voltage is of an incorrect polarity or is of a correct polarity and is either above a predetermined magnitude or below a second predetermined magnitude, the detector provides a signal voltage to the alarm indicator 3, which causes a visual and/or audible alarm to be signalled. Since by action of the scanner 1, the input signal to the detector 2 is the voltage of the individual cells of the battery 4 and since during each scan cycle each cell of the battery 4, is connected for a short period of time to the input of the detector 2, then an alarm is generated for any individual cell which has a potential that is either above or below preset limits or which is reversed in polarity.

The alarm indicator 3, may be a lamp or an audible signal generator which provides either a pulsed or continuous alarm signal when the potential of one or more cells of the battery is outside the acceptable limits. The alarm indicator 3 response is controlled by the output signal from the detector 2 applied to input terminal 6. Electrical wires 7a and 7b carry power required to operate the scanner 1; the detector 2; and the alarm indicator 3. These power wires, 7a and 7b, preferably are connected to the battery being monitored or alternatively to an external D.C. power source.

SCANNER AND BATTERY

Figure 2:
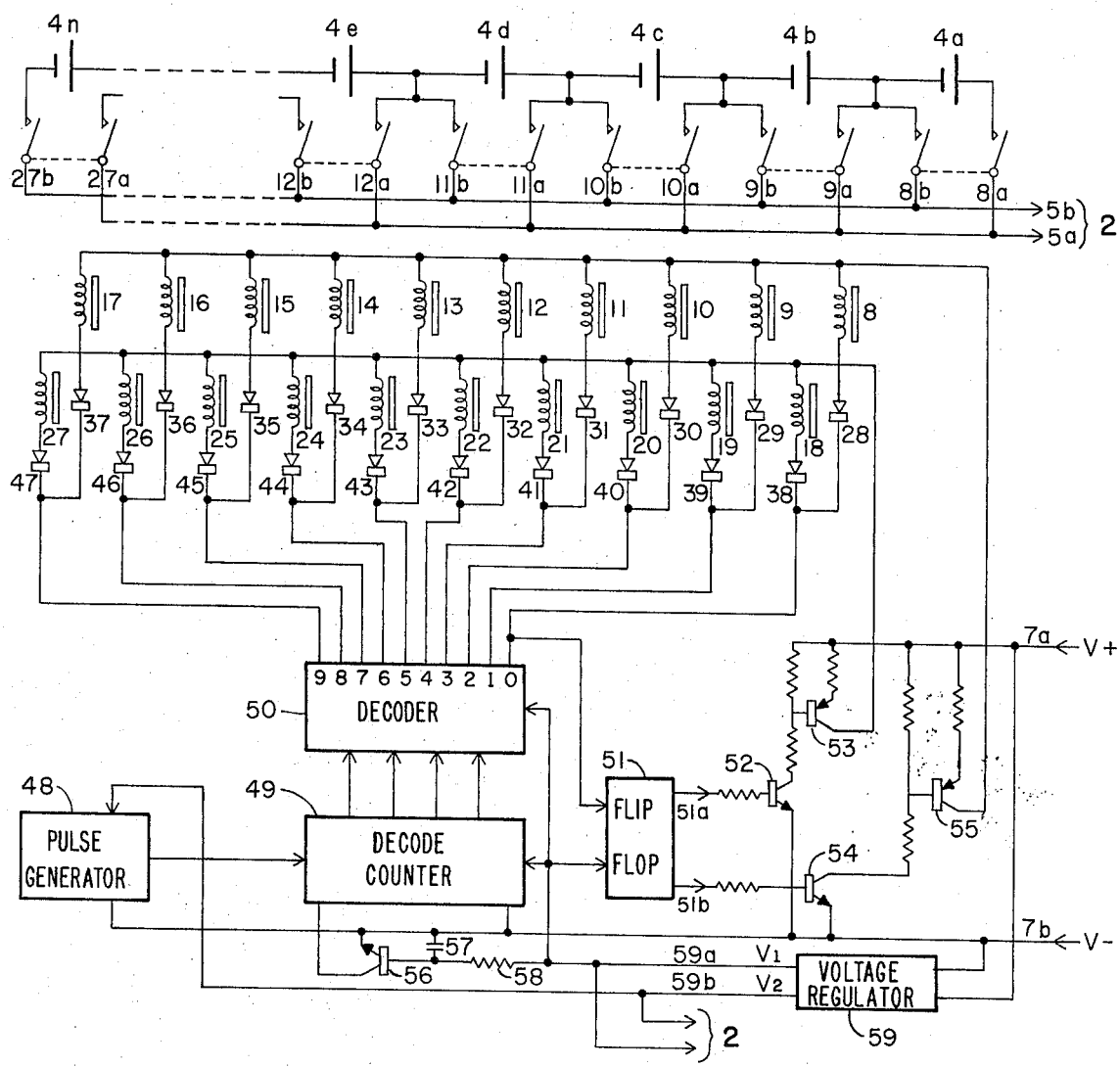
FIG. 2 is a schematic circuit diagram of the battery and the scanner.

My preferred scanner, as shown in FIG. 2, provides that each terminal of each cell of the battery 4 is connected to a separate contact of several relays 8–27. Each of the relays 8–27 has two contact points which are both open when the relay is deenergized and both closed when the relay is energized. The contacts associated with each relay are indicated by the subscripts *a* and *b*. For example, 8a and 8b are contacts which are closed when an electrical current of sufficient magnitude flows through the coil 8 of the relay. The contacts are open when no current flows through said coil 8.

The scanner 1 is arranged so that only one relay is energized at any time one time. During the first time interval, relay 8 is energized causing contacts 8a and 8b to be closed. During this time interval the positive terminal of the battery cell 4a is connected through relay-contact 8a to the line 5a and the negative terminal of battery cell 4a is connected through relay contact 8b to line 5b. Thus the potential of cell 4a appears across lines 5a and 5b which are the input terminals of the detector 2. Since all other contacts to the battery 4 are open, only the potential of cell 4a influences the potential difference between lines 5a and 5b.

During the next time interval, relay 8 is de-energized causing contacts 8a and 8b to open and the next relay 9 is energized causing contact points 9a and 9b to close which connects cell 4b across the detector input lines 5a and 5b. During the next time interval relay 9 is de-energized causing contacts 9a and 9b to be open and the next relay 10 is energized causing contacts 10a and 10b to close and battery cell 4c to be connected across the detector input lines 5a and 5b. This action continues until all relays have been energized, one at a time, and all cells of the battery 4 have been singly-connected across the detector-input lines 5a and 5b. Then the cycle starts over and the cells are again scanned in the above described manner and such action continues as long as the scanner is supplied with power.

A pulse generator, 48 produces output voltage pulses at a repetition rate equal to the desired stepping rate of the scan relays, 8 through 27. The pulses from the pulse generator 48 are fed into the decade counter 49. The decade counter 49 produces a binary-coded-decimal (BCD) output equivalent to the number content (in the range 0 through 9) of the counter. The output from the decade counter is connected to a BDC to Decimal Decoder 50 which provides ten output lines. Each output is related to a separate number in the range 0 through 9. The combined action of the Decade Counter 49 and the Decoder 50 is to cause one and only one of the ten output lines to conduct current at any one time and the line which conducts is associated with the number of pulses which has entered the Decade Counter 49 from the Pulse Generator 48.

Initially the resistor-capacitor network 57 and 58 with transistor 56 causes the Counter 49 to be set to zero and under this condition current may flow into line 0 of the Decoder 50. Current flow in the 0 line causes either relay 8 or relay 18 to be energized. After an appropriate time interval the pulse generator 48 produces a pulse which causes a count of 1 to be registered. Line 0 becomes non-conductive thereby de-energizing relay, 8 or 18 and line 1 of the Decoder 50 becomes conductive which energizes relay 9 or relay 19. Each pulse from the pulse generator 48 causes the count to advance one step and causes the associated relay to be energized and all other relays de-energized. The tenth pulse in the sequence causes the counter to again be in a reset or 0 count condition and the sequence repeats.

The relays 8 through 17 are furnished power through transistor 55 and the relays 18 through 27 are furnished power through transistor 53. Transistors 53 and 55 are controlled by the flip-flop 51 through associated resistors and transistors 52 and 54 respectively in such a manner that only one of the two is conductive at any one time.

Relays in the group 8 through 17 may be energized only when transistor 55 is conductive and relays in the group 18 through 27 may be energized only when transistor 53 is conductive. The flip-flop 51 has two outputs 51a and 51b and at any one time one output is zero and the other output is not zero. The output to the flip-flop 51 is from the 0 line of the Decoder 50 and operation of the flip-flop is such that every time a count of 0 is registered in the counter the flip-flop reverses state i.e. the output that has been zero becomes non-zero and the output that has been non-zero becomes zero.

Consider initially a count of zero and output 51b is non-zero causing transistor 54 to conduct which in turn causes transistor 55 to conduct. Output 51a is zero. This causes transistor 52 to be non-conducting and this, in turn, causes transistor 53 to be non-conducting.

Under these conditions only line 0 of the Decoder 50 is conductive only relay 8 is energized. On the next pulse, only relays in the group 8 through 17 may be energized, so only 9 is energized. This is continued on succeeding pulses until all relays in the group 8 through 17 have been energized for one time interval. On the tenth pulse the counter again reaches the 0 count condition and the flip-flop is caused to change state. This causes transistors 54 and 55 to become non-conducting and transducers 52 and 53 to become conducting.

Under these conditions only relays in the group 18 through 27 may be energized and, since only line 0 of the Decoder 50 is conductive, relay 18 is energized. On the next pulse, line 1 of the Decoder 50 becomes conductive, relay 19 is energized and relay 18 de-energized. This is continued on succeeding pulses until all relays in the group 18 through 27 have been individually energized for a period equal to the time interval between pulses. On the twentieth pulse the counter again reaches the 0 count condition and the flip-flop is caused to change state back to the initial condition allowing relays 8 through 17 to be energized one at a time in order. Then again the group 18 through 27 and the scanning action continues as long as the circuit is energized.

The diodes 28 through 47 allow current flow through the relays only when the associated lines from the Decoder 50 are conductive. The voltage regulator 59 provides appropriate D.C. power at the potential required to operate the electronic circuits. The operating power for the scanner is a D.C. voltage, V, which perferably is obtained from the battery 4 or may be from some appropriate, alternate source. While operation of the circuit is discussed in terms of electromechanical relays it should be understood that equivalent solid state devides which perform similar switching functions may be substituted without altering the concept of the invention.

DETECTOR AND ALARM

Figure 3:
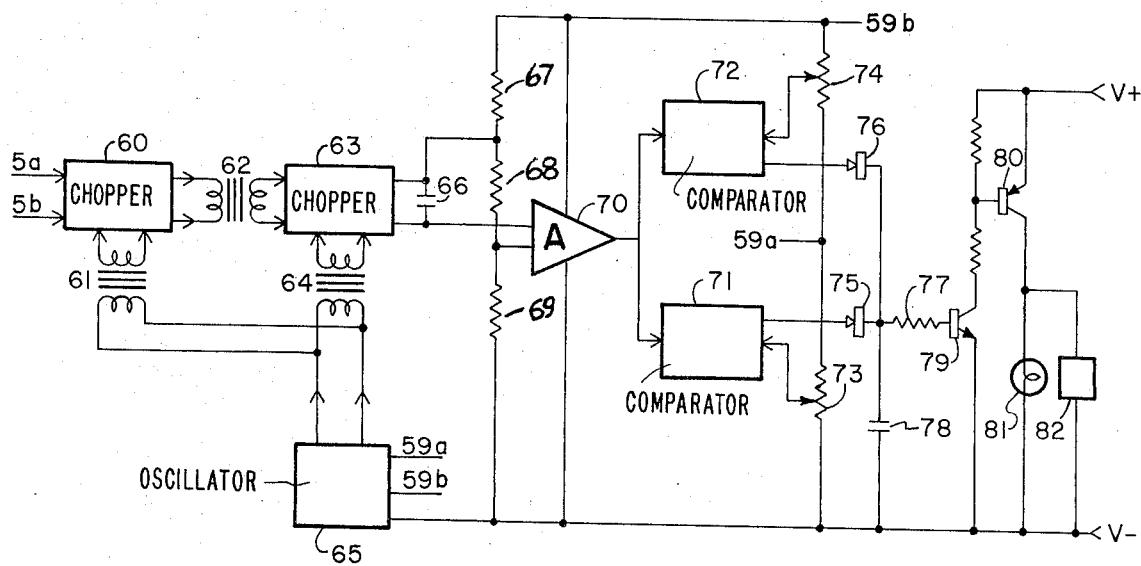
FIG. 3 is a schematic circuit diagram of the detector and the alarm.

FIG. 3 shows a functional diagram of the detector 2. The voltage of each cell of the battery 4 being monitored is applied in sequence, by the action of the scanner 1 across the input lines 5a and 5b of the detector 2. To allow power for operation of the detector 2 to be supplied from either the battery 4 or from a power source which is not completely isolated from the battery 4 and to obtain isolated measurements of the potential of each cell, it is necessary to provide an input circuit for the detector which is completely insulated from any connection to the battery except those through lines 5a and 5b.

This is made possible in the Detector 2 by using a chopper 60 to convert the cell potential appearing between lines 5a and 5b to a proportional A.C. voltage. Transformer 62 is then used to couple the said A C. signal into following circuits while using the insulation between transformer windings to provide the required D.C. isolation. Chopper 63 synchronously converts the A.C. signal back to a proportional D.C. voltage. A.C. voltage to operate the choppers 60 and 63 is supplied by a common oscillator 65 which is coupled to the choppers 60 and 63 by transformers 61 and 64 respectively. The D.C. output from chopper 63 is filtered to remove ripple by a capacitor 66.

The resultant D.C. voltage, which is proportional to the cell voltage appearing between lines 5a and 5b, is applied to the input of amplifier 70. Resistors 67, 68, and 69 are so chosen that the voltage appearing across resistor 68 is equal to the voltage appearing across capacitor 66 for a cell voltage near the mid-point between the high-acceptable-limit and the low-acceptable-limit. For such a cell voltage the output voltage of amplifier 70 is at the mid-point of its range. Thus, the amplifier 70 output-voltage increases and decreases in proportion to the voltage appearing between line 5a and 5b.

The output of the amplifier 70 is connected to both a low-voltage comparator 71 and a high-voltage comparator 72. The low-voltage comparator 71 provides a non-zero output voltage through diode 75, if the amplifier 70 output-voltage falls below a value set by potentiometer 73. The high-voltage comparator 72 provides a non-zero output voltage if the amplifier 70 output-voltage raises above a value set by potentiometer 74. A non-zero output from either comparator charges capacitor 78 and turns "on" transistor 79 through resistor 77. Conduction through transistor 79 causes transistor 80 to conduct and applies a voltage to visual indicator 81 and/or an audible alarm generator 82. The alarm indicators 81 and 82 remain on for a period, determined by the RC time constant of 77 and 78 after the amplifier output returns to a value between the low-voltage and high-voltage set points.

Figure 4:
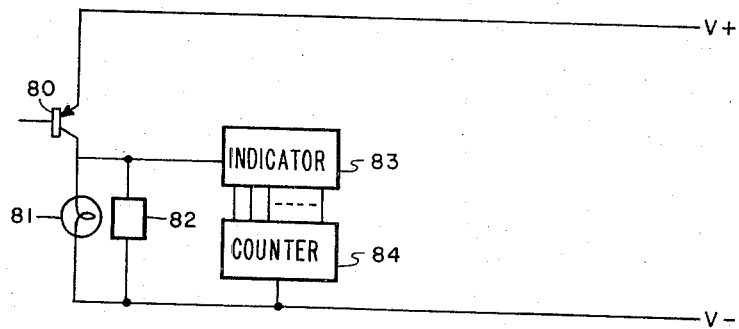
FIG. 4 is a schematic circuit diagram of a cell identification means.

FIG. 4 shows a means of identifying any particular cell which is outside the preset limits. The indicator means 83 is connected to a counter means 84 which may be the counter means 49 and 50 previously described or a separate counter means that is synchronized with counter means 49 and 50 and operating in a similar manner. The indicator means 83 provides a separate indication for each cell in the battery. The indication may be a particular lamp associated with each cell or a numerical display of an assigned cell number. In operation the indicator 83 is not turned on unless transistor 80 is conducting. When transistor 80 is conducting the indicator 83 shows an identification of the particular cell which is connected through previously described scanner 1 to the detector 2. Since transistor 80 is only conductive for cells which are outside the preset limits the indicator 83 identifies the particular cell.

Figure 5:
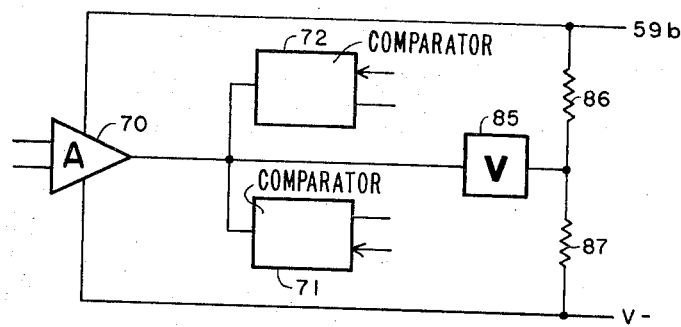
FIG. 5 is a schematic circuit diagram of a cell level indicating means.

FIG. 5 shows a means of indicating the level of any cell. A voltmeter 85 is connected between the output of amplifier 70 and the junction of two resistors 86 and 87. Resistors 86 and 87 provide a reference voltage against which the voltmeter 85 compares the output of the amplifier 70. Since the amplifier output is proportional to the voltage across each cell the voltmeter indicates the voltage of each cell as the scanner sequentially connects each cell to the detector as previously described. As examples of the components used in the drawings and illustrated by box representations, the following are standard off-the-shelf components that could have been purchased and used as of the date of filing of this application.

TABLE

| Item number | Item description | Manufacturer | Manufacturer's designation | Manufacturer's part number |
|---|---|---|---|---|
| 48 | Pulse Generator | Motorola | Silicon unijunction transistor | 2N4948 |
| 49 | Decade counter | Texas Instruments | Decade counter | SN7490 |
| 50 | Decoder | Texas Instruments | BCD two decimal decoder/driver | SN7445 |
| 51 | Flip flop | Texas Instruments | Dual J-K master slave flip flop | SN74L73 |
| 59 | Voltage regulator | Signetics | Five volt voltage regulator | LM309K |
| 60 | Chopper | Motorola | N-channel junction field effect transistor | 2N5638 |
| 63 | Chopper | Motorola | N-channel junction field effect transistor | 2N5638 |
| 67 | Oscillator | Motorola | Silicon annular unijunction transistor | 2N4948 |
| 71 | Low voltage comparator | Motorola | PNP silicon annular transistor | 2N4403 |
| 72 | High voltage comparator | Motorola | NPN silicon annular transistor | 2N4401 |
| 82 | Alarm generator | Mallory | Sonalert electronic signal | SC628 |

OPERATION OF THE PREFERRED EMBODIMENT

In operation, the Scanner 1 causes each cell of the battery 4 to be individually connected in sequence to the input of the Detector 2. For cells that provide a potential within acceptable limits, the output voltage of amplifier 70 is between the low- and high- comparator voltage set-points, transistor 80 is non-conducting and the alarm indicators 81 and 82 are not energized. If a cell is encountered in the scan which is producing a potential below the pre-set acceptable limits, the amplifier 70 output voltage falls below the low-voltage comparator 71 set point and the alarm is turned on for a period equal to the amount of time that cell is connected across 5a and 5b by the scanner, plus an additional time determined by the RC time constant of 77 and 78. Conversely, if a cell is encountered in the scan which is producing a potential above the pre-set acceptable limits the amplifier 70 output voltage rises above the high voltage comparator 72 set point and the alarm is similarly turned on. Thus the alarm indicator is turned on once during each scan cycle for each cell producing a potential either above or below the preset limits.

Having now described a preferred embodiment what I claim as my invention is:

1. A battery monitor system for multi-cell batteries comprising:
   continuous scanner means for sequentially and repeatedly establishing contact across individual cells of the battery;
   detector means coupled to said scanner means for evaluating the electrical condition of the cell being connected to said scanner means;
   means for comparing the electrical condition of the cell with a preselected range of voltages, said comparing means emitting an electrical signal when said electrical condition is outside said predetermined range; and
   alarm means controlled by said electrical signal for producing an alarm signal upon receiving said electrical signal from said comparing means; said scanner means includes
   a pulse generator generating uniformly timed pulses;
   a counter means for counting said uniformly timed pulses, said counter means having outputs equal in number to the number of cells to be monitored; and
   a group of relays actuated by one of said output counter means, said relays being operable to provide individual electrical connections to one of said battery cells.

2. Battery monitor system as set forth in claim 1 further including;
   a group of relays connected and parallel to said first group of relays; and
   flip-flop means connected between said first and second responsive groups of relays to one of said outputs of said counter means to alternate from said first to said second relay groups.

3. A battery monitor system as set forth in claim 1 further including a means for indicating if a particular cell within said multi-cell battery is outside said predetermined voltage range, said indicating means being operatively connected through said scanner means.

* * * * *